Patented Nov. 22, 1938

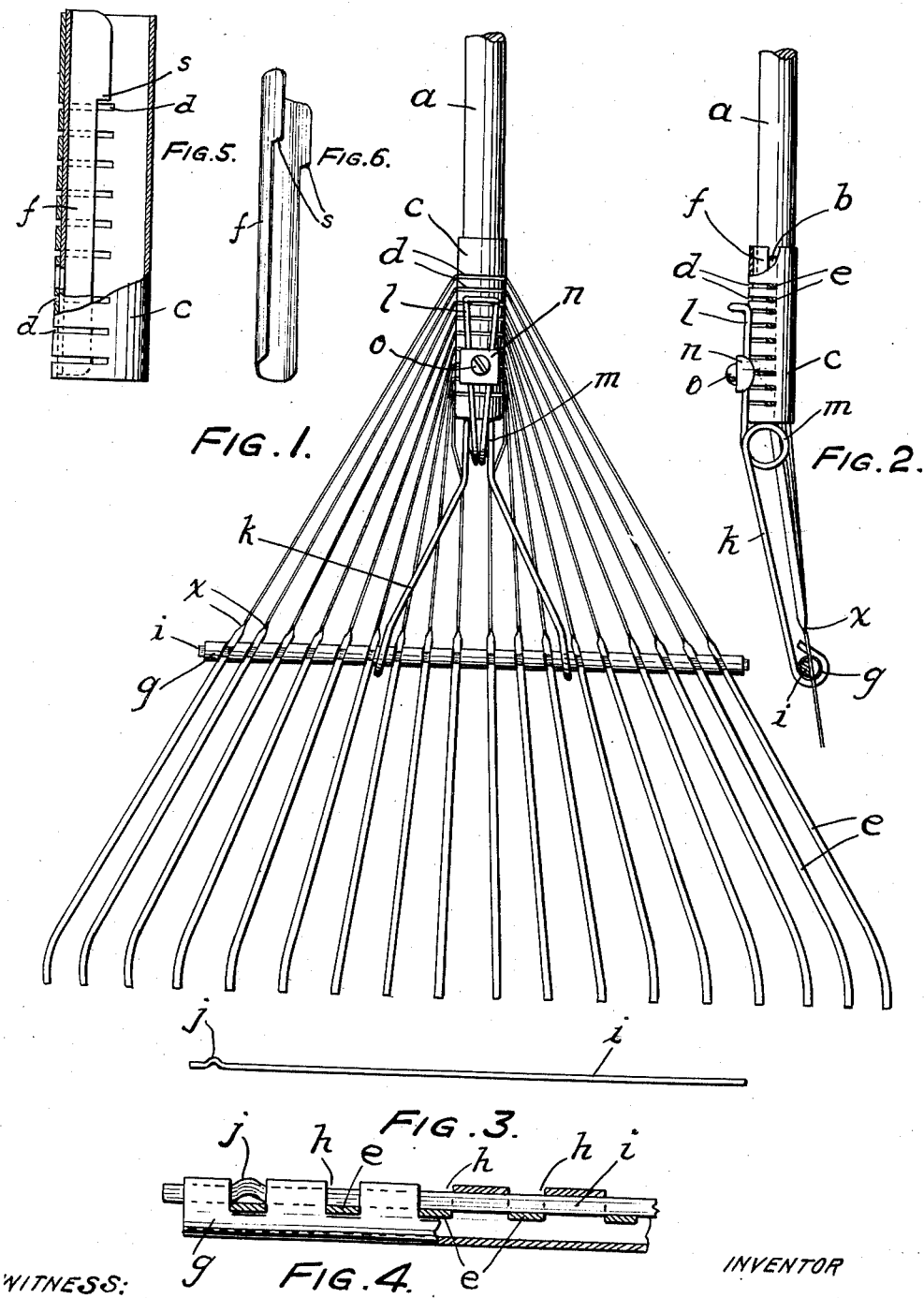

2,137,795

UNITED STATES PATENT OFFICE 2,137,795

RAKE

Alfred J. Bailie, Wyndmoor, Pa.

Application July 7, 1937, Serial No. 152,302

4 Claims. (Cl. 55—10)

This invention relates to an improvement in rakes of the type adapted more especially for use on lawns, as for raking after mowing, raking leaves, etc.

More particularly, this invention relates to an improvement on the rake structure described and claimed in United States Letters Patent No. 1,959,893, issued to me on May 22, 1934.

Generally speaking, the rake in accordance with this invention will be characterized by the provision of a ferrule adapted to receive the end of a handle and also to receive and support the teeth of the rake, in combination with a spacing element engaged with the teeth at points in alignment spaced from the ferrule and a stiffening means for the teeth engaged with the ferrule and the spacer.

The improvement constituting the present invention lies more particularly in the structure of the spacer, all as will appear and be made clear by the following detailed description.

Having now indicated in a general way the nature and purpose of this invention, I will proceed to a more detailed description of the preferred embodiment thereof with reference to the accompanying drawing, in which:

Figure 1 is a plan view of a rake embodying this invention, the handle being broken off.

Figure 2 is a side view, partly in section, of the subject of Figure 1, the handle and the ends of the teeth being broken off.

Figure 3 is a view showing a detail of the invention.

Figure 4 is a detailed view, partly broken away, showing a detail of the invention.

Figure 5 is a detail view of a ferrule, partly in section.

Figure 6 is a perspective view of a modified form of ferrule key.

In the several figures $a$ indicates a rake handle which may be of any usual type and of any usual material, as, for example, wood. The handle $a$ is provided with a slot $b$ at one end.

$c$ indicates a ferrule formed to receive the slotted end of the handle $a$ and provided with a series of circumferential slots $d$, $d$ extending through somewhat more than half of its circumference. The slots $d$, $d$ are adapted to receive the teeth $e$, $e$, which pass through the slot $b$ in handle $a$ when the handle is assembled with the ferrule. $f$ indicates a key or sleeve, semi-circular in cross section and conforming to the ferrule. The key $f$ is adapted for insertion into the ferrule between the handle $a$ and the ferrule to close the slots $d$, $d$ over the teeth and lock the teeth to the ferrule.

The body of the key $f$ is preferably cut away to form the forwardly extending shoulders $s$ at points spaced from an end of the key about equal to the spacing of the first slot $d$ from the rear end of the ferrule $c$.

When the teeth $e$ are assembled in the slots $d$ in the ferrule, the key $f$ is inserted over the teeth to close the slots $d$ and is stopped when fully inserted by engagement of the shoulders $s$ with the tooth lying in the slot $d$ nearest the rear end of the ferrule, as will be clear from an inspection of Figure 5.

A hole is drilled through the ferrule, handle and key for the passage of a bolt $o$ by which the elements are secured together.

The teeth $e$, $e$ are desirably, though not necessarily, formed from flat material, as any suitable metal having suitable resiliency and resistance to wear. The teeth, for example, may be formed of steel and may be of any desired size. The teeth will desirably be assembled edgewise with the ferrule and handle and will be twisted half around, as shown at $x$, $x$, Figures 1 and 2, at points in alignment spaced from the ferrule, so that they will extend flatwise to their free ends.

The teeth may and desirably will be somewhat hooked at their ends, as shown in Figure 1.

The spacer for the teeth $e$, $e$ comprises a hollow member $g$, which, while it may be of various shape in cross section, will most conveniently comprise a tube provided with a series of slots $h$, $h$ extending in line with the desired extension of the several teeth, respectively, and a key or locking member $i$ distorted adjacent one end as at $j$.

In assembling the spacer with the teeth, the teeth just beyond the points $x$, $x$ at which they are bent, are engaged flatwise in the slots $h$, $h$ of the member $g$ and the key is inserted over the teeth and closes the slots $h$, $h$, whereby the spacer is retained in position on the teeth. The key $i$ is distorted at such a point $j$ with respect to its end that when it is inserted within the member $g$ to close the slots $h$, $h$, the distortion will engage in the slot nearest the end of the member $g$ and act to lock the spacer within the member.

The key $i$ may be of any desirable form, but most conveniently will be in the form of a rod and will have a flattened surface adapted to overlie and bear on the surface of the teeth.

The parts will have sufficient spring so that in the final movement of inserting the key within the member $g$, the distortion $j$ can be sprung into engagement in the end slot in the member $g$, shown, for example, in Figure 4.

The spring k forms a stiffening means for the teeth. The spring k is formed, for example, from a length of relatively heavy spring wire bent upon itself to form a loop l, coiled as at m, and having its end portions extending divergently from the coils m to engagement with the member g of the spacer, about which the ends may be hooked, for example, as shown in Figure 2.

The coiled end of the spring k is secured to the top of the ferrule by means of washer n and bolt o, which passes through the hole provided in the ferrule, key and handle and effectively secures the various parts together.

As will now be observed, the integrity of the spacer structure is insured irrespective of how the rake may be handled, inasmuch as the key i which acts to close the slots h, h in the member g and hence retain the teeth therein is positively locked to the member g. At the same time, the spacer may be readily assembled and disassembled, since the means for locking the key to the spacer, for example the distortion of the key at j, may be readily sprung into and out of engagement with the slot in the member g with which it engages to lock the key in position.

It will be understood that it is not intended that this invention shall be in any wise limited by the specific details herein given by way of example of a preferred embodiment of the invention, inasmuch as various modifications may be made in detail without departing from the scope of the invention.

What I claim and desire to protect by Letters Patent is:

1. A rake including, in combination, a ferrule, a spacer comprising a slotted hollow member, a plurality of teeth secured to the ferrule and positioned within the slots in the spacer at points spaced from the ferrule, a key extending within the spacer and closing the slots therein and means carried by the key adapted to engage in one of said slots and lock the key within the spacer.

2. A rake including, in combination, a ferrule, a spacer comprising a slotted hollow member, a plurality of teeth secured to the ferrule and positioned within the slots in the spacer at points spaced from the ferrule, a key extending within the spacer and closing the slots therein, said key being distorted adjacent one end for engagement in one of said slots to positively lock said key within the spacer.

3. A rake including, in combination, a ferrule provided with a series of slots, teeth positioned within the slots in the ferrule, a key extending within the ferrule and adapted to close the slots therein, said key having shoulders adjacent one end adapted to engage with a tooth positioned in one of said slots, a spacer engaged with the teeth on a line spaced from the ferrule and means adapted to positively engage the spacer and lock it in engagement with the teeth.

4. A rake including, in combination, a ferrule provided with a series of slots, teeth positioned within the slots in the ferrule and a key extending within the ferrule and adapted to close the slots therein, said key having shoulders adjacent one end adapted to engage with a tooth positioned in one of said slots.

ALFRED J. BAILIE.